(12) United States Patent
Faruque et al.

(10) Patent No.: US 11,577,680 B1
(45) Date of Patent: Feb. 14, 2023

(54) ASSEMBLY FOR A VEHICLE INCLUDING A SLIDABLE BASE WITH TRAY AND AIRBAG

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/674,947

(22) Filed: Feb. 18, 2022

(51) Int. Cl.
*B60R 21/20* (2011.01)
*B60R 21/0136* (2006.01)
*B60N 3/00* (2006.01)

(52) U.S. Cl.
CPC .............. *B60R 21/20* (2013.01); *B60N 3/002* (2013.01); *B60R 21/0136* (2013.01)

(58) Field of Classification Search
None
See application file for complete search history.

(56) References Cited

U.S. PATENT DOCUMENTS

| | | | |
|---|---|---|---|
| 5,161,820 A * | 11/1992 | Vollmer | B60R 21/01524 280/730.1 |
| 9,096,150 B2 * | 8/2015 | Cuddihy | B60N 2/3056 |
| 10,059,296 B2 | 8/2018 | Farooq et al. | |
| 10,232,815 B1 | 3/2019 | Dry et al. | |
| 10,525,922 B1 * | 1/2020 | Lin | B60R 21/2338 |
| 10,766,447 B2 | 9/2020 | Jung | |
| 11,034,323 B2 | 6/2021 | Farooq et al. | |
| 11,091,110 B2 | 8/2021 | Takemura et al. | |
| 11,097,680 B2 * | 8/2021 | Jayakar | B60R 21/232 |
| 11,273,785 B1 * | 3/2022 | Faruque | B60R 21/01554 |
| 11,325,551 B2 * | 5/2022 | Campbell | B60R 21/20 |
| 2020/0017058 A1 | 1/2020 | Jaradi et al. | |
| 2020/0037757 A1 | 2/2020 | Onoyama | |
| 2020/0376989 A1 * | 12/2020 | Simecek | B64D 11/062 |
| 2021/0046890 A1 * | 2/2021 | Jayakar | B60R 21/20 |
| 2022/0134991 A1 * | 5/2022 | Farooq | B60R 21/214 280/730.1 |
| 2022/0203923 A1 * | 6/2022 | Jaradi | B60R 21/264 |

FOREIGN PATENT DOCUMENTS

| | | | | |
|---|---|---|---|---|
| CN | 114103865 A | * | 3/2022 | ........... B60R 21/213 |
| DE | 10361227 A1 | | 7/2005 | |

* cited by examiner

*Primary Examiner* — Nicole T Verley

(74) *Attorney, Agent, or Firm* — Frank A. MacKenzie; Bejin Bieneman PLC

(57) ABSTRACT

An assembly for a vehicle includes a vehicle floor. The assembly includes a base slidably supported by the vehicle floor with the base being slidable relative to the vehicle floor from a stowed position to a deployed position. The assembly includes a tray supported by the base and an airbag supported by the base adjacent the tray.

20 Claims, 9 Drawing Sheets

ASSEMBLY FOR A VEHICLE INCLUDING A SLIDABLE BASE WITH TRAY AND AIRBAG

BACKGROUND

Passenger vehicles are not typically designed to accommodate wheelchairs. Therefore, accommodations for wheelchairs in vehicles are typically installed with aftermarket modifications to a production vehicle. For example, a vehicle may be modified with a lift or the like to load a wheelchair onto a vehicle. Production vehicles typically do not have the ability to accommodate the wheelchair of an occupant in a manner allowing the occupant to sit in the wheelchair in the vehicle, or if they do, significant aftermarket modification is required.

Additionally, vehicles are equipped with airbags. In the event of an impact, an inflator activates and provides inflation medium to the airbags, and the airbags pressurize and act as supplemental restraints for occupants during the impact. The airbags are located at various fixed positions in passenger compartments of vehicles. Vehicles may include airbags supported on a dash, side air curtains mounted to the roof rails, side airbags mounted to seats, etc.

DETAILED DESCRIPTION

Figure 1:
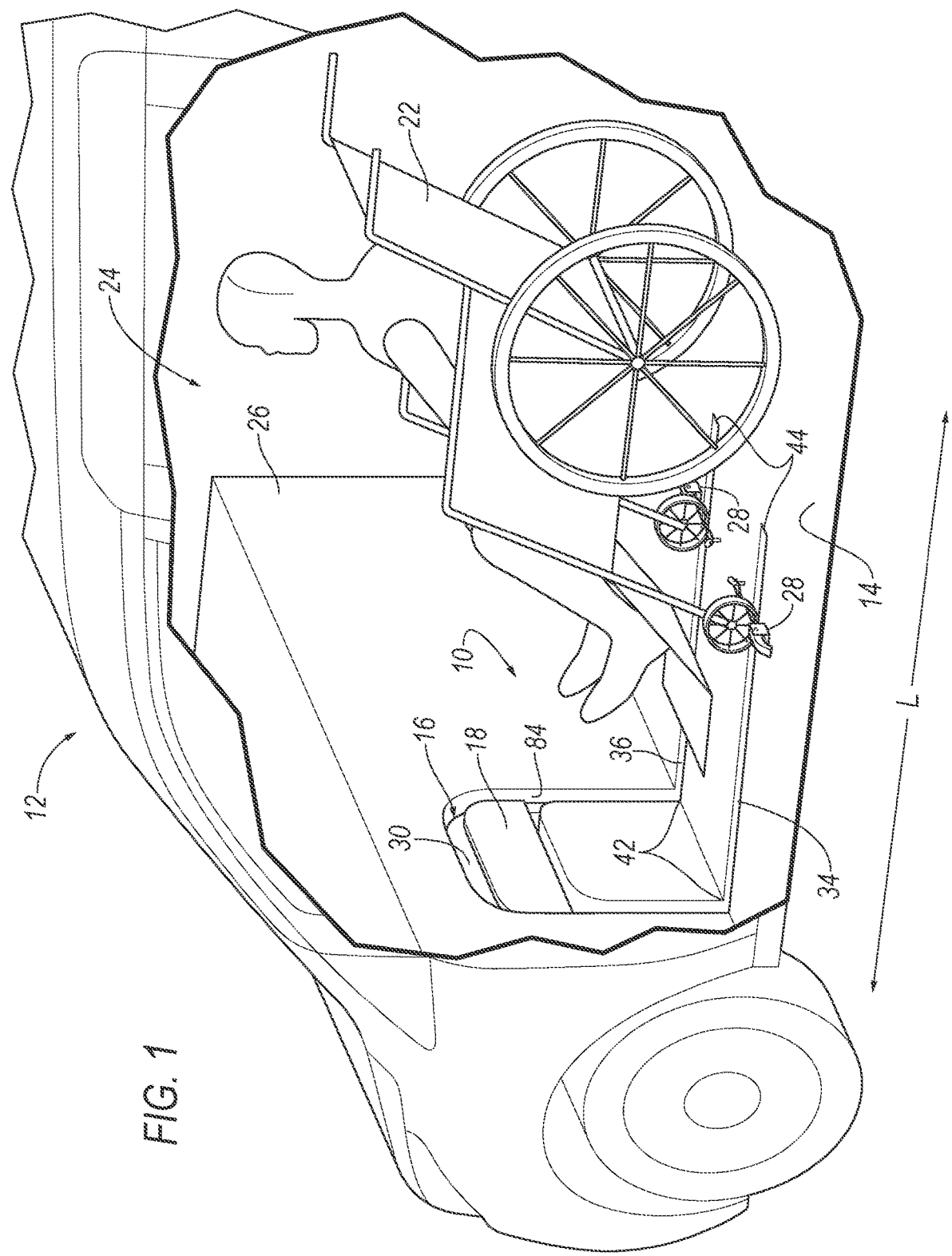
FIG. 1 is a perspective view of a vehicle having a base slidable along a vehicle floor with the assembly in a stowed position.
Figure 2:
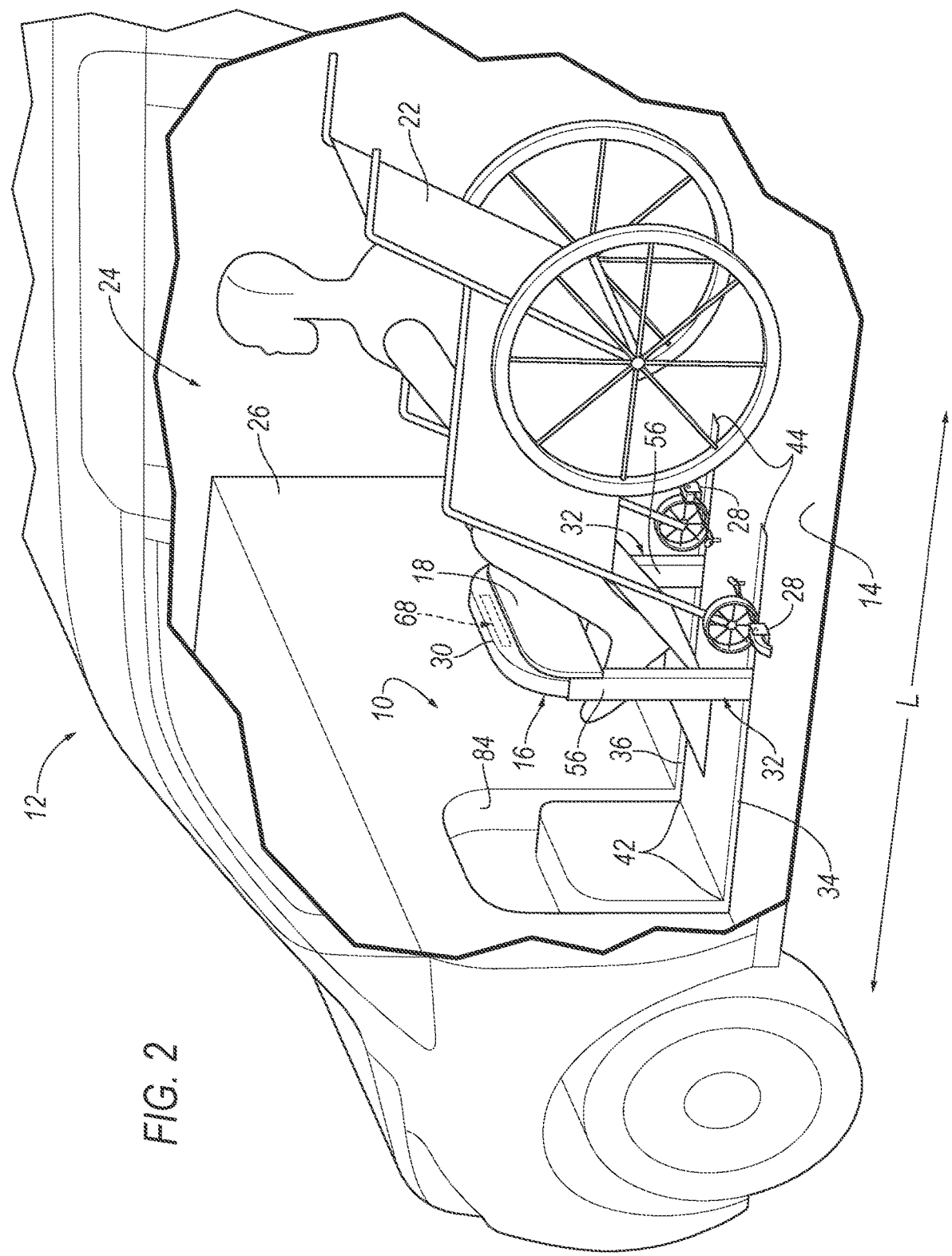
FIG. 2 is a perspective view of the vehicle having the base slidable along the vehicle floor with the assembly in a deployed position.

An assembly for a vehicle includes a vehicle floor. The assembly includes a base slidably supported by the vehicle floor with the base being slidable relative to the vehicle floor from a stowed position to a deployed position. The assembly includes a tray supported by the base and an airbag supported by the base adjacent the tray.

The assembly may include a track supported by the vehicle floor, the base being slidably engaged with the track.

The assembly may include a second track supported by the vehicle floor and spaced from the track, the base being slidably engaged with the second track.

The base may include a pair of legs spaced from each other and a top portion extending from one leg to the other leg, the legs being slidably engaged with the track and the second track.

The track may be elongated along a vehicle-longitudinal axis.

The base may be slidable along a vehicle-longitudinal axis from the stowed position to the deployed position.

The base may include a pair of legs spaced from each other and a top portion extending from one leg to the other leg, the legs being slidably supported by the vehicle floor.

The legs maybe telescopic from a lowered position to a raised position.

The airbag may be supported by the top portion.

The base may be telescopic from a lowered position to a raised position.

The assembly may include a dash, the base being adjacent the dash in the stowed position and spaced from the dash in the deployed position.

The airbag may be inflatable away from the dash.

The dash may define a recess, the recess receiving the base in the stowed position.

The tray may be rotatable from a lowered position to a raised position and the airbag is inflatable from an uninflated position to an inflated position, the airbag abutting the tray when the tray is in the raised position and the airbag is in the inflated position.

The base may slide vehicle-rearward from the stowed position to the deployed position.

The airbag may inflate vehicle-rearward from the base.

The assembly may include a computer including a processor and a memory storing instructions executable by the processor to identify a position of a wheelchair along a vehicle-longitudinal axis of a vehicle and slide the base along the vehicle-longitudinal axis to a position corresponding to the position of the wheelchair.

The memory may store instructions executable by the processor to inflate the airbag in response to detection of a vehicle impact.

The memory may store instructions executable by the processor to telescope the base from a lowered position to a raised position adjacent the wheelchair when the base is in the position corresponding to the position of the wheelchair.

The memory may store instructions executable by the processor to indicate the vehicle will move into Drive and slide the base from the stowed position to the deployed position based on the indication that the vehicle will move into Drive.

With reference to the Figures, wherein like numerals indicate like parts throughout the several views, an assembly 10 for a vehicle 12 includes a vehicle floor 14. The assembly 10 includes a base 16 slidably supported by the vehicle floor 14 with the base 16 being slidable relative to the vehicle floor 14 from a stowed position to a deployed position. The assembly 10 includes a tray 18 supported by the base 16 and an airbag 20 supported by the base 16 adjacent the tray 18.

The stowed position of the base 16 allows for space within the vehicle 12 to allow passengers to enter and exit the vehicle 12 without obstruction of the base 16. Specifically, in the example shown in the Figures, the stowed position allows a wheelchair 22 to be positioned in the vehicle 12 without obstruction of the base 16. After the wheelchair 22 is positioned in the vehicle 12, the base 16 slides relative to the floor toward the occupant seated in the wheelchair 22, i.e., the deployed position. In other examples, the vehicle 12 may include seats. In such examples, the stowed position allows occupants to be seated in the seats without obstruction of base 16. After the occupants are seated, the base 16 may slide relative to the floor toward the occupant of the seat. The occupant of either the wheelchair 22 or the seat, depending on the example, may use the tray 18 supported by the base 16 as a table, a workspace, etc., when the base 16 is in the deployed position. In the event of an impact to the vehicle 12, the airbag 20 supported by the base 16 may inflate to an inflated position to control the kinematics of the occupant. The airbag 20 uses the base 16 as a reaction surface to control the kinematics of the occupant. The airbag 20 may change or adjust the position of the tray 18 to inflate to the inflated position.

With reference to FIGS. 1-2 and 4-5, the vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle 12. In other words, the vehicle 12 may be autonomously operated such that the vehicle 12 may be driven without constant attention from a driver, i.e., the vehicle 12 may be self-driving without human input.

The vehicle 12 includes a vehicle body (not numbered). The vehicle body may be of a unibody construction. In the unibody construction, the body, e.g., rockers, serves as a vehicle frame, and the vehicle body (including the rockers, pillars, roof rails, etc.) is unitary, i.e., a continuous one-piece unit. As another example, the vehicle body and frame may have a body-on-frame construction (also referred to as a cab-on-frame construction). In other words, the vehicle body and frame are separate components, i.e., are modular, and the vehicle body is supported on and affixed to the frame. Alternatively, the vehicle body may have any suitable construction. The vehicle body may be formed of any suitable material, for example, steel, aluminum, etc.

The vehicle 12 defines a passenger compartment 24 to house occupants, if any, of the vehicle 12. The passenger compartment 24 may extend across the vehicle 12, i.e., from one side to the other side of the vehicle 12. The passenger compartment 24 includes a front end and a rear end with the front end being in front of the rear end during forward movement of the vehicle 12.

The vehicle 12 includes the vehicle floor 14. The vehicle floor 14 may define the lower boundary of the passenger compartment 24 and may extend from the front end of the passenger compartment 24 to the rear end of the passenger compartment 24. The vehicle floor 14 may include upholstery, for example, carpet, and may have a class-A surface facing the passenger compartment 24, i.e., a surface specifically manufactured to have a high quality, finished, aesthetic appearance free of blemishes.

The vehicle 12 includes at least one dash 26. In the example shown in the Figures, the vehicle 12 includes one dash 26 at the front end of the passenger compartment 24. In addition or in the alternative, the vehicle 12 may include another dash 26 at the rear end of the passenger compartment 24. The dash 26 may also be called a bulkhead or an instrument panel.

The dash 26 may be a structural member of a frame (not numbered) of the vehicle 12, i.e., a portion of the frame resists static and dynamic forces from operation of the vehicle 12 without undue deflection or distortion. Examples of forces include a weight of other vehicle components, passengers, and cargo; twisting forces caused by driving over uneven surfaces; torque from a transmission; longitudinal and lateral forces from driving; and possibly forces from impacts with other vehicles or impactors.

The dash 26 may include vehicle controls, such as gauges, dials, screens, and information displays; heating and ventilation equipment; a radio and other electronics; etc. The dash 26, as well as the rest of the vehicle 12, may lack a steering wheel and may lack pedals for accelerating and braking. In other words, as shown in FIGS. 1-2 and 4-5, no steering wheel or pedals for accelerating and braking are supported by or adjacent to the dash 26. More specifically, the vehicle 12 does not include a steering wheel or pedals for accelerating and braking, e.g., the vehicle 12 is autonomous.

The dash 26 may extend from one side of the vehicle 12 to the other side of the vehicle 12, i.e., across the passenger compartment 24 in a cross-vehicle direction. For example, the dash 26 may extend from one body pillar to another body pillar. The dash 26 may extend downwardly from a windshield. For example, the dash 26 may extend from the windshield to a floor of the vehicle 12.

The dash 26 may be in front of seats or a wheelchair 22 of the vehicle 12, e.g., at the front end of the passenger compartment 24, as shown in FIGS. 1-2 and 4-5. In such an example, the dash 26 faces the seats or wheelchair 22. The dash 26 may, for example, include a class-A surface, i.e., a surface specifically manufactured to have a high quality, finished aesthetic appearance free from blemishes.

The dash 26 may, for example, be flat in the cross-vehicle direction. In other words, the dash 26 may be generally planar. Specifically, the vehicle-rearward face may be flat.

In the example shown in the Figures, the assembly 10 may be configured relative to a wheelchair 22 in the passenger compartment 24. In such examples, the vehicle 12 may include an assembly 10 for any number of wheelchairs 22 in the passenger compartment 24. In other examples, the assembly 10 may be configured relative to a seat (not shown) in the passenger compartment 24. In such an example, the vehicle 12 may include one or more seats and any number of assemblies 10 equal to the number of seats in the vehicle 12. In examples where the vehicle 12 includes seats, the vehicle 12 may include any suitable number of seats. The seats may be supported by the vehicle floor 14. The seats may be arranged in any suitable arrangement in the passenger compartment 24. As in the example shown in the Figures, one or more of the seats may be at the front end of the passenger compartment 24, e.g., a driver seat and/or a passenger seat. In other examples, one or more of the seats may be behind the front end of the passenger compartment 24, e.g., at the rear end of the passenger compartment 24. The seats may be movable relative to the vehicle floor 14 to various positions, e.g., movable fore-and-aft and/or cross-vehicle. The seat may be of any suitable type, e.g., a bucket seat. Specifically, the seat, also referred to as a vehicle seat, may be of any suitable type traditionally used in vehicles for seating occupants in the vehicle. The vehicle 12 may include any combination of seats and positions for wheelchairs 22. In other words, the vehicle 12 accommodate both wheelchair 22 occupants and occupants seated in the seat.

Such as in the example shown in the Figures, the wheelchair 22 may be secured to the vehicle floor 14 relative to the dash 26. The vehicle 12 may include any suitable way to secure the wheelchair 22 to the vehicle floor 14. For example, the vehicle floor 14 may include a latch 28 that secures the wheelchair 22. The latch 28 may be manually operated, e.g., an occupant must secure the latch 28, or the latch 28 may be automatic, e.g., latch 28 may include a solenoid that moves when the wheelchair 22 is to be locked.

With reference to FIGS. 1-5, the assembly 10 includes the base 16 supported by the vehicle floor 14. The base 16 may extend upwardly from the vehicle floor 14 to a top portion 30. Specifically, the base 16 includes a pair of legs 32 supported by the vehicle floor 14 that extend upwardly from the vehicle floor 14 to the top portion 30. The legs 32 are spaced from each other. Specifically, the legs 32 are spaced cross-vehicle from each other. The top portion 30 extends from one leg 32 to the other leg 32. Specifically, the top portion 30 may be elongated cross-vehicle from one leg 32 to the other leg 32. The base 16 is vehicle-forward of the occupant of the vehicle 12. Specifically, the base 16 is vehicle-forward of the wheelchair 22, as shown in FIGS. 1-2 and 4-5, or, in other examples, the base 16 is vehicle-forward of the seat.

The base 16 is slidably supported by the vehicle floor 14. Specifically, the legs 32 of the base 16 are slidably supported by the vehicle floor 14. In other words, the base 16, i.e., the legs 32 of the base 16, is slidable relative to the vehicle floor 14 from the stowed position to the deployed position. The base 16 slides along the vehicle floor 14 from the stowed position to the deployed position. The base 16 slides along a vehicle-longitudinal axis L. Specifically, the base 16 slides vehicle-rearward along the vehicle-longitudinal axis L when the base 16 slides from the stowed position to the deployed position and vehicle-forward along the vehicle-longitudinal axis L when the base 16 slides from the deployed position to the stowed position.

With reference to FIGS. 1-2, 4-5, and 6A-7B, the assembly 10 may include one or more tracks 34, 36, supported by the vehicle floor 14. In the example shown in the Figures, the assembly 10 includes a first track 34 and a second track 36 spaced from the first track 34. The adjectives first and second relating to the tracks 34, 36, are used throughout this document as identifiers and, unless explicitly stated otherwise, are not intended to signify importance, order, or quantity. The base 16 may be slidably engaged with the tracks 34, 36. Specifically, one of the legs 32 of the base 16 is engaged with the first track 34 and the other of the legs 32 of the base 16 is engaged with the second track 36. The legs 32 of the base 16 slide relative to the floor along the tracks 34, 36. The first track 34 and the second track 36 are elongated along the vehicle-longitudinal axis L. The first track 34 and the second track 36 may be elongated along the vehicle-longitudinal axis L for the base 16 to move along the vehicle-longitudinal axis L from the stowed position to the deployed position.

With reference to FIG. 6A-7B, the assembly 10 may include one or more track linear actuators 38 fixed to one or more of the tracks 34, 36 and drivably coupled to the base 16 to move the base 16 along the tracks 34, 36 between the stowed position and the deployed position. Specifically, as shown in the example in the Figures, a first track linear actuator 38 may be coupled to one of the legs 32 of the base 16 to slide the leg 32 along the first track 34 and a second track linear actuator 38 may be coupled to the other of the legs 32 of the base 16 to slide the leg 32 along the second track 36. Each of the track linear actuators 38 may move simultaneously such that each of the legs 32 move simultaneously. In other words, the track linear actuators 38 slide the legs 32 of the base 16 at the same rates.

The track linear actuator 38 may include a track lead screw 40 extending along the tracks 34, 36, i.e., from a first end 42 of tracks 34, 36, to a second end 44 of the tracks 34, 36. The legs 32 of the base 16 each include a carriage 46 at a bottom of the legs 32 that allows the base 16 to move along the track lead screw 40 to a deployed position. The track linear actuator 38 may include a track electric motor 48 fixed to each of the tracks 34, 36, e.g., for driving the track lead screw 40 or equivalent mechanism. The track electric motor 48 may rotate the track lead screw 40 to move the legs 32 between the stowed position and the deployed position. The carriage 46 carries the base 16 along the threading of the track lead screw 40 to move legs 32 along the tracks 34, 36. The threading of the track lead screw 40 may be tuned to adjust the rate at which the base 16 may move along the tracks 34, 36. The track linear actuator 38 may be in communication with a sensor (not shown) identifying the location of the base 16 along the tracks 34, 36. In other examples, the track linear actuator 38 may include any suitable mechanism to move the base 16 from the stowed position to the deployed position.

With continued reference to FIGS. 6A-7B, the tracks 34, 36, may include locks 50 to lock the base 16 in the deployed position in the event of an impact. The airbag 20 may use the base 16, specifically, the top portion 30, as a reaction surface when the airbag 20 is in the inflated position. In such an event, the base 16 may tilt, i.e., be at an angle less than 90 degrees relative to the tracks 34, 36, and vehicle floor 14 vehicle-forward of the base 16, vehicle-forward due to forces on the base 16 during the impact. When the base 16 tilts vehicle-forward, the lock 50 limits movement of the base 16 vehicle-forward along the tracks 34, 36. The tracks 34, 36, may define a plurality of holes 52 along a top surface of the track and the carriage 46 may include pegs 54 extending upwardly toward the holes 52 of the track. When the base 16 tilts in the event of an impact, the pegs 54 are received by the holes 52 to limit movement of the carriage 46 and base 16 vehicle-forward along the tracks 34, 36. During normal operation of the vehicle 12, i.e., when there is not an impact, the pegs 54 are not received by the holes 52 in the track and the carriage 46 is able to move freely within the tracks 34, 36.

As shown in FIG. 1, in the stowed position, the base 16 is adjacent the dash 26. The stowed position of the base 16 allows for space within the passenger compartment 24 for occupants to move without obstruction of the base 16. Once occupants are seated, either in a wheelchair 22 positioned in the passenger compartment 24 or in a seat in the passenger compartment 24, the base 16 may slide relative to the vehicle floor 14 to the deployed position. In some examples, the base 16 may abut the dash 26 in the stowed position. The dash 26 may define a recess 84 that receives the base 16 in the stowed position. In some examples, the base 16 may be flush with the dash 26, i.e., the base 16 does not protrude away from the dash 26 when the base 16 is in the stowed position. In other examples, only a portion of the base 16 may be received by the recess 84 of the dash 26, i.e., a portion of the base 16 may protrude away from the dash 26 in the stowed position.

As shown in FIGS. 2-5, in the deployed position, the base 16 is spaced from the dash 26. The base 16 may be adjacent the wheelchair 22 or seat that is nearest the base 16 when the base 16 is in the deployed position. The legs 32 of the occupant, either seated in the wheelchair 22 or the seat, extend between the legs 32 of the base 16 when the base 16 is adjacent the wheelchair 22 or seat in the deployed position.

The base 16 may be telescopic from a lowered position to a raised position. Specifically, the legs 32 of the base 16 are telescopic from the lowered position to the raised position. In other words, the legs 32 of the base 16 may include multiple segments. For example, as shown in the Figures, the legs 32 include a lower segment 56 and an upper segment 58. The upper segment 58 of each leg 32 may move relative to the lower segment 56. The upper segment 58 may move upwardly away from the vehicle floor 14 toward the raised position.

Figure 3:
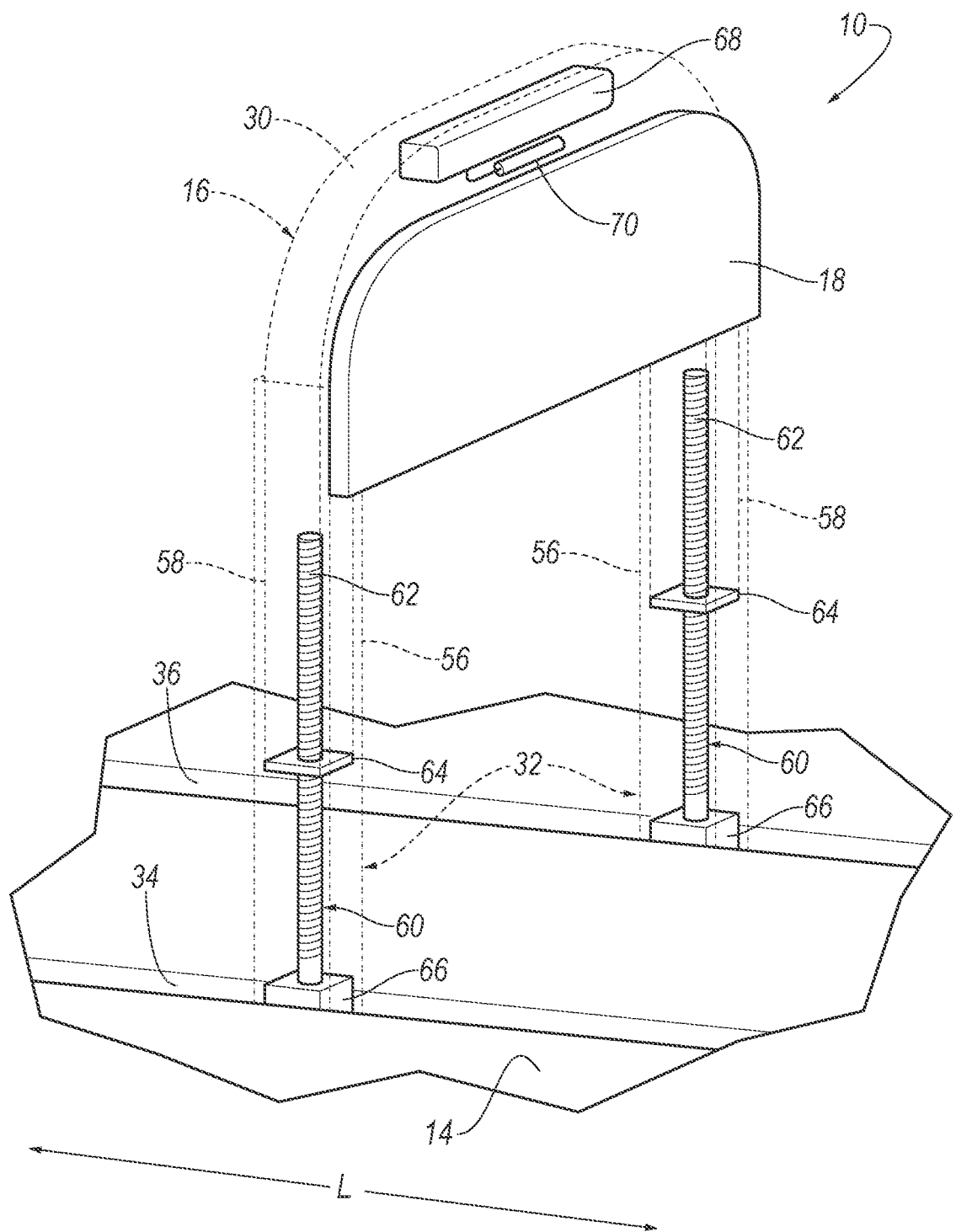
FIG. 3 is a perspective view of the base having a legs including linear actuators.
Figure 4:
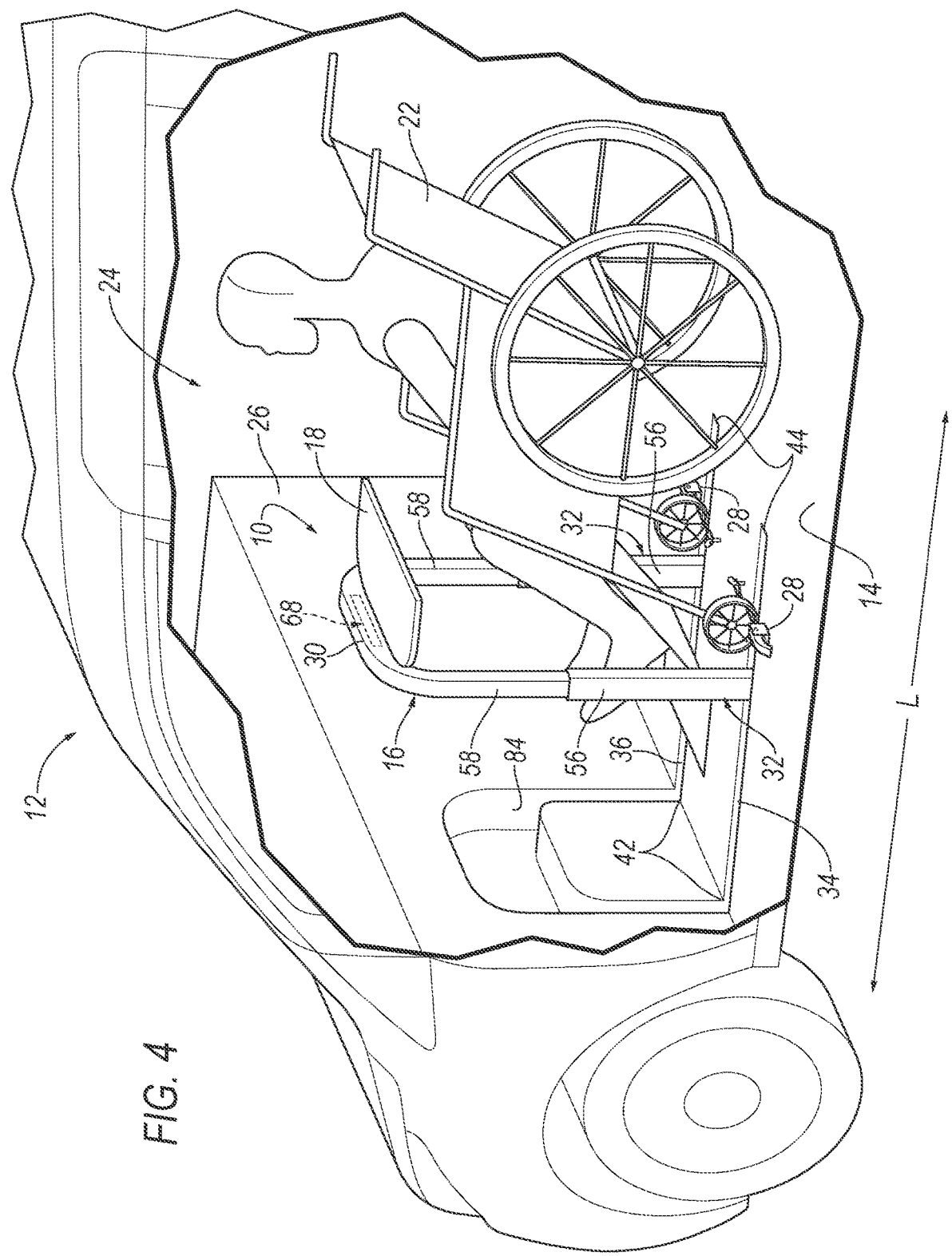
FIG. 4 is a perspective view of the base having a tray with the base in a raised position and the tray in a raised position.

With reference to FIG. 3, the legs 32 may each include leg linear actuators 60 drivably coupled to the upper segment 58 to move the upper segment 58 relative to the lower segment 56 from the lowered position and the raised position. Each of the leg linear actuators 60 may move simultaneously such that each of the upper segments 58 move simultaneously. In other words, the leg linear actuators 60 move the upper segments 58 of the legs 32 at the same rates.

The leg linear actuator 60 may include a leg lead screw 62 extending along the legs 32, i.e., from the lower segment 56 to and through the upper segment 58. The upper segment 58 may include a flat bottom 64 through which the leg lead screw 62 extends. The leg linear actuator 60 may include a leg electric motor 66 fixed to segments, e.g., for driving the leg lead screw 62 or equivalent mechanism. The leg electric motor 66 may rotate the leg lead screw 62 to move the legs 32 between the lowered position and the raised position. The flat bottom 64 the upper portion along the threading of the leg lead screw 62 to move legs 32 upwardly or downwardly. The threading of the leg lead screw 62 may be tuned to adjust the rate at which the legs 32 may move. The leg linear actuator 60 may be in communication with a sensor (not shown) identifying the height of the legs 32. In other examples, the leg linear actuator 60 may include any suitable mechanism to move the legs 32 from the lowered position to the raised position.

With reference to FIGS. 1-5, the assembly 10 includes the tray 18 supported by the base 16. The tray 18 may be rotatably supported by the base 16. Specifically, the tray 18 may be rotatably supported by the top portion 30 of the base 16. The tray 18 is rotatable from a lowered position to a raised position. When the base 16 is in the stowed position, the tray 18 remains in the lowered position. When the base 16 is in the deployed position, the tray 18 may be in the raised position. In the deployed position, an occupant of the vehicle 12 may use the tray 18 as a table, a workspace, etc. The tray 18 may include a hinge connected to the top portion 30 of the base 16. The tray 18 rotates about the hinge from the lowered position to the raised position.

In some examples, the tray 18 may be moved automatically between the raised position and the lowered position, i.e., with a mechanism including a motor. In such an example, the automatic movement of the tray 18 may be based on an input by an occupant or based on movement of the vehicle 12. In other examples, an occupant of the vehicle 12 may manually move the tray 18. In such an example, the occupant may move the tray 18 between the lowered position and the raised position at their leisure, i.e., when the occupant wants to the use the tray 18 as a table or workspace, the occupant may move the tray 18 to the raised position and when the occupant is finished using the tray 18 moving the tray 18 to the lowered position.

Figure 5:
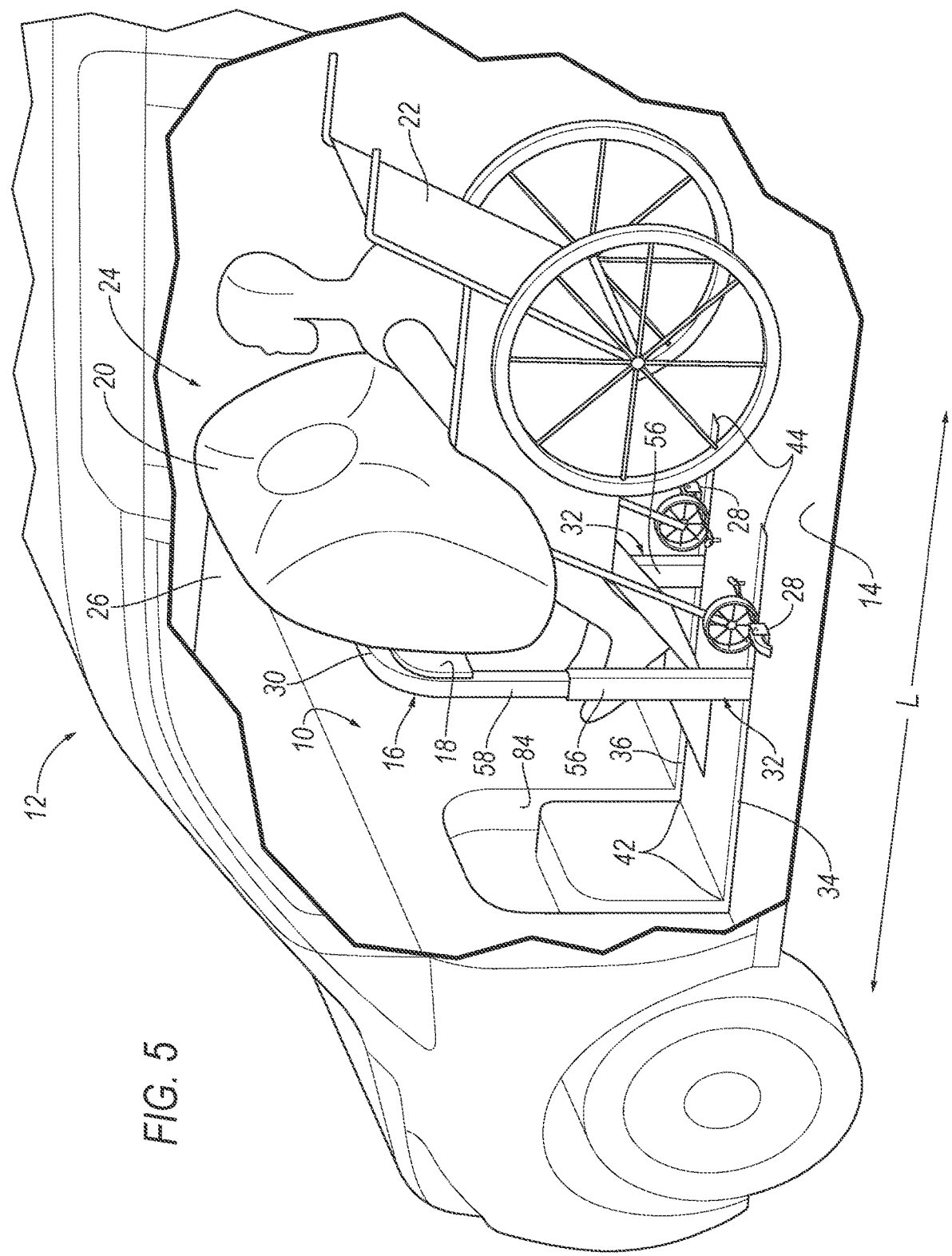
FIG. 5 is a perspective view of the base having an airbag in an inflated position.
Figure 6A:
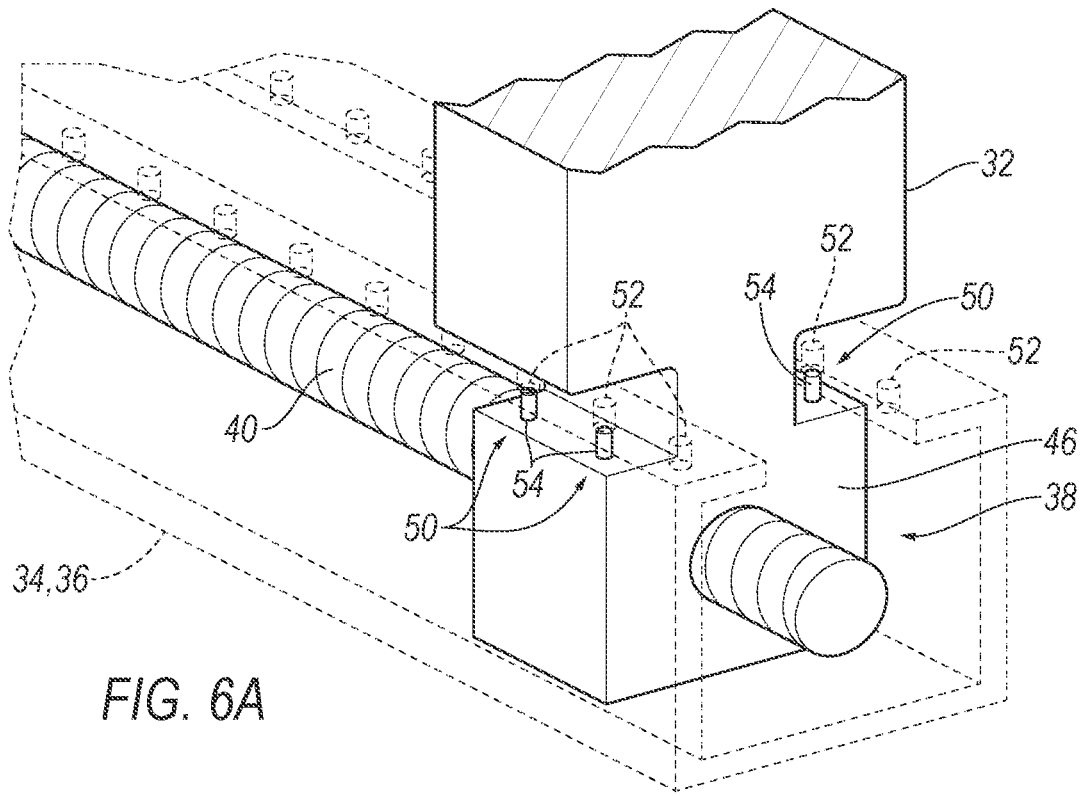
FIG. 6A is a perspective view of a track that the base slides along in normal operation.
Figure 6B:
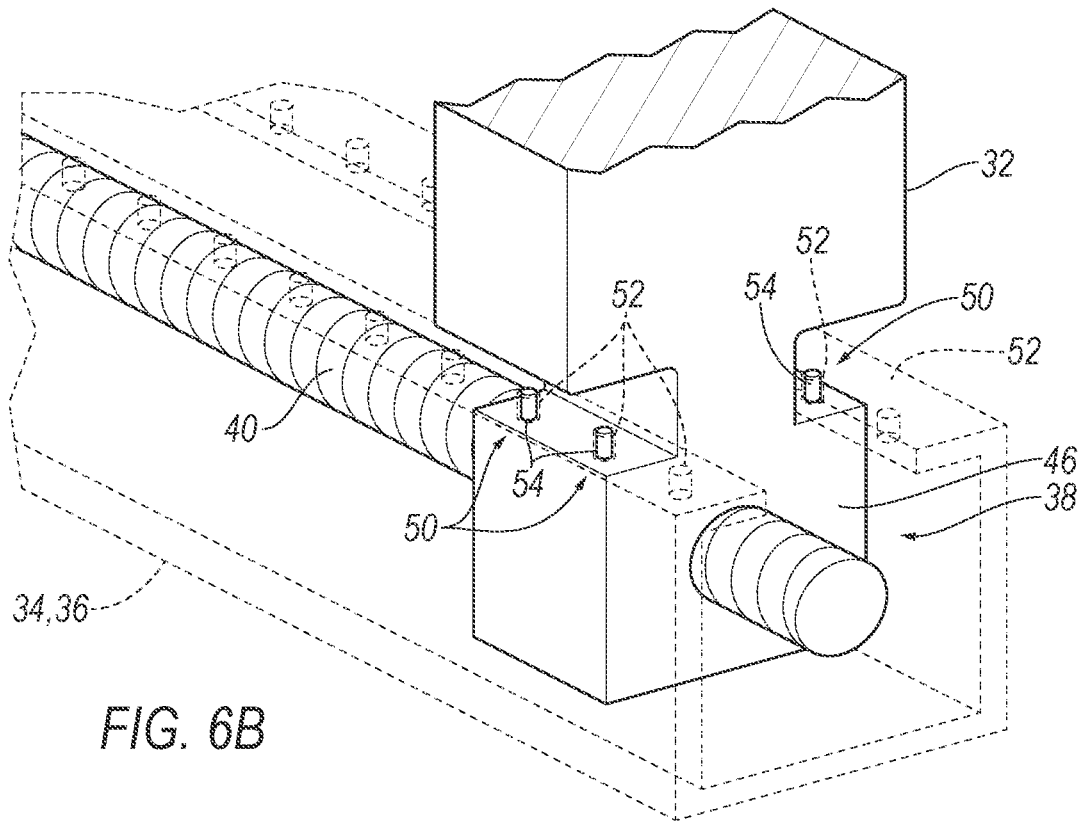
FIG. 6B is a perspective view of the track that the base slides along when the base is tilted vehicle forward.
Figure 7A:
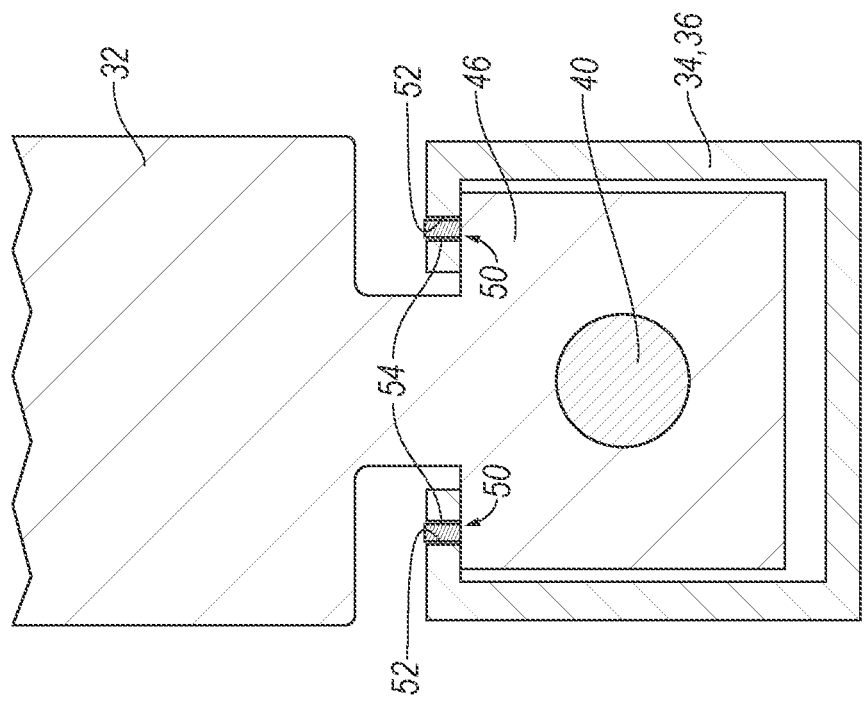
FIG. 7A is a cross-sectional view through line 6A of FIG. 6A.
Figure 7B:
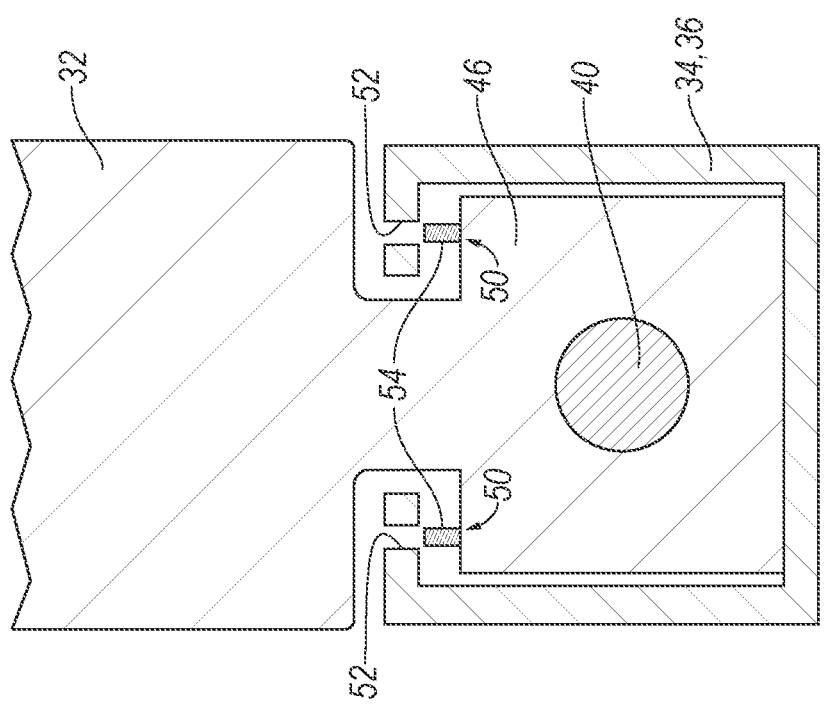
FIG. 7B is a cross-sectional view through line 6B of FIG. 6B.

With reference to FIGS. 3 and 5, the assembly 10 includes an airbag assembly 68 supported by the base 16. Specifically, the airbag assembly 68 is supported by the top portion 30 of the base 16. The airbag assembly 68 includes the airbag 20, an inflator 70, and may include a housing (not shown). The vehicle 12 may include any suitable number of airbag assemblies 68. In examples including more than one base 16, each of the bases 16 of the vehicle 12 may include one airbag assembly 68. In examples including more than one airbag assembly 68, the airbag assemblies 68 may be identical or substantially identical to each other so long as the airbag assemblies 68 are supported by a base 16 in the vehicle 12.

The inflator 70 is fluidly connected to the airbag 20. The inflator 70 expands the airbag 20 with inflation medium, such as a gas, to move the airbag 20 from an uninflated position to the inflated position. The inflator 70 may be, for example, a pyrotechnic inflator that ignites a chemical reaction to generate the inflation medium, a stored gas inflator that releases (e.g., by a pyrotechnic valve) stored gas as the inflation medium, or a hybrid.

The airbag 20 is supported by the base 16. Specifically, the airbag 20 is supported by the top portion 30 of the base 16. The airbag 20 is supported by the top portion 30 of the base 16 adjacent the tray 18. The airbag 20 is in the uninflated position when the base 16 is in the stowed position, i.e., when the base 16 is in the recess 84 of the dash 26. The airbag 20 may inflate to the inflated position when the base 16 is in the deployed position and the vehicle 12 experiences an impact, e.g., a frontal impact. In the event of the impact to the vehicle 12, the airbag 20 inflates from the uninflated position to the inflated position away from the top portion 30 of the base 16. Specifically, the airbag 20 inflates vehicle-rearward from the base 16. In other words, the airbag 20 inflates toward the occupant of the wheelchair 22 or the seat adjacent the base 16 in the event of an impact.

When the airbag 20 is in the inflated position, the airbag 20 uses the base 16 as the reaction surface to control the kinematics of the occupant. Specifically, the airbag 20 uses the top portion 30 of the base 16 as the reaction surface to control the kinematics of the occupant. As shown in FIG. 5, the airbag 20 may define a concavity where an occupant may contact the airbag 20 in the event of an impact to the vehicle 12. The concavity may face toward the occupant when the airbag 20 is in the inflated position.

As shown in FIG. 5, in examples where the tray 18 is in the raised position and the vehicle experiences an impact, the airbag 20 inflates to the inflated position. In such an example, the airbag 20 abuts the tray 18 when the airbag 20 inflates to the inflated position. The force of the airbag 20 against the tray 18 as the airbag 20 moves to the inflated position may push the tray 18 downwardly, i.e., toward the floor. Specifically, the airbag 20 may move the tray 18 from the raised position to the lowered position.

The airbag 20 may be fabric, e.g., a woven polymer. As an example, the airbag 20 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

The vehicle 12 may include a vehicle computer 72 including a processor and a memory. The memory includes one or more forms of computer readable media, and stores instructions executable by the vehicle computer 72 for performing various operations, including as disclosed herein. For example, a vehicle computer 72 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a vehicle computer 72 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

The memory can be of any type, e.g., hard disk drives, solid state drives, servers, or any volatile or non-volatile media. The memory can store the collected data sent from the sensors. The memory can be a separate device from the computer, and the computer can retrieve information stored by the memory via a network in the vehicle 12, e.g., over a CAN bus, a wireless network, etc. Alternatively or additionally, the memory can be part of the computer, e.g., as a memory of the computer. The computer may include programming to operate one or more of vehicle brakes, propulsion, e.g., control of acceleration in the vehicle 12 by controlling one or more of an internal combustion engine, electric motor, hybrid engine, etc., steering, climate control, interior and/or exterior lights, etc., as well as to determine whether and when the computer, as opposed to a human operator, is to control such operations. Additionally, the computer may be programmed to determine whether and when a human operator is to control such operations.

The computer may include or be communicatively coupled to, e.g., via a vehicle network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc.

Figure 8:
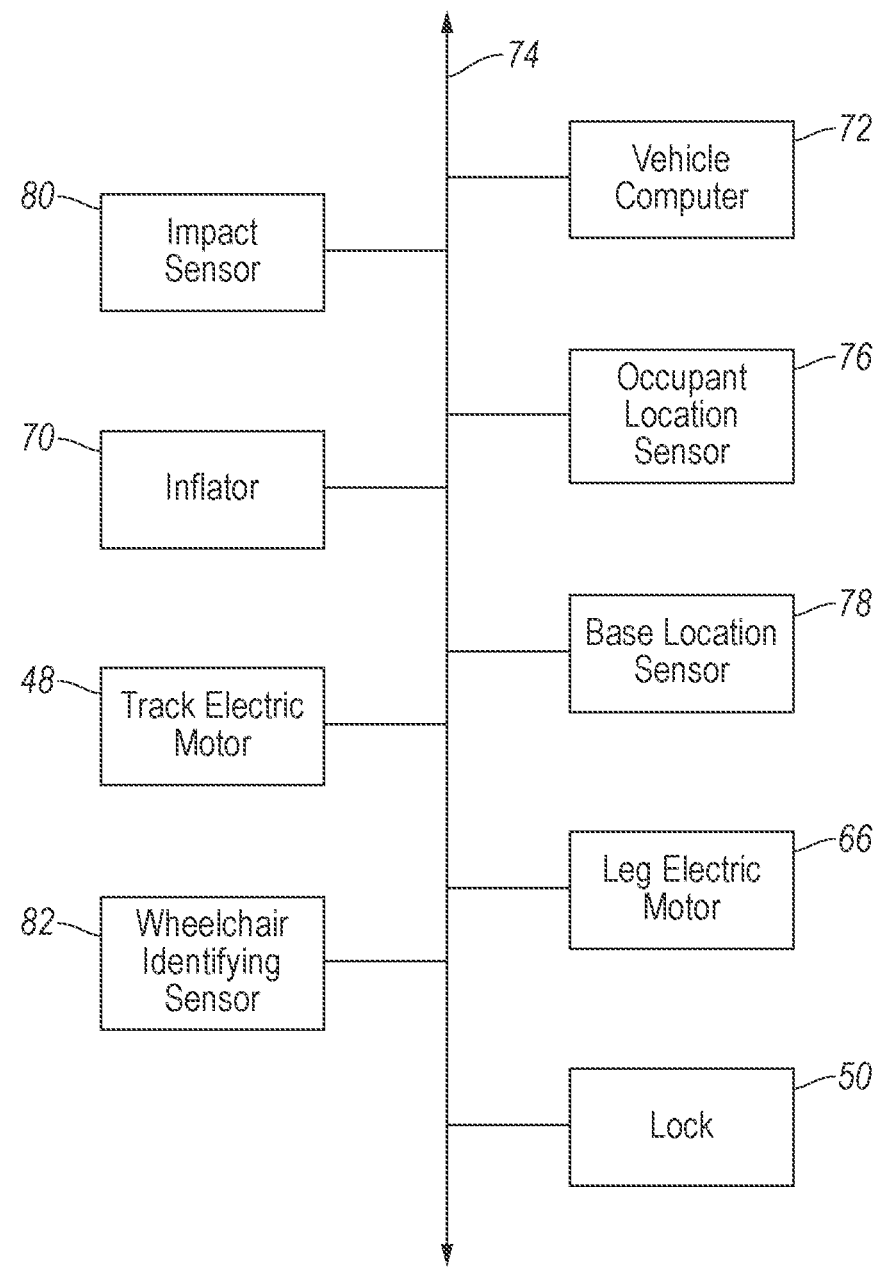
FIG. 8 is a block diagram of a vehicle communication network of the vehicle.

With reference to FIG. 8, the computer is generally arranged for communications on a vehicle communication network 74 that can include a bus in the vehicle 12 such as a controller area network CAN or the like, and/or other wired and/or wireless mechanisms. Alternatively or additionally, in cases where the computer actually comprises a plurality of devices, the vehicle communication network 74 may be used for communications between devices represented as the computer in this disclosure. Further, as mentioned below, various controllers and/or sensors may provide data to the computer via the vehicle communication network 74.

The vehicle 12 may include occupant location sensors 76 to determine the location of either the wheelchair 22, as shown in the Figures, or, in other examples, a seat. The occupant location sensors 76 may be in communication with the vehicle computer 72. The occupant location sensors 76 may send a signal to the vehicle computer 72 to indicate the location of the wheelchair 22 or seat along the vehicle-longitudinal axis. The vehicle 12 may include any suitable number of occupant location sensors 76 to determine where along the vehicle-longitudinal axis any seats or wheelchairs 22 are located. In other words, the vehicle 12 may include a number of occupant location sensors 76 equal to the number of potential occupants, in seats or wheelchairs 22, which may be present in the vehicle 12. The occupant location sensors 76 may be any suitable type of sensor. For example, the occupant location sensors 76 may be cameras, weight sensors in the vehicle 12, etc.

The vehicle 12 may include base location sensors 78 to determine the location of the base 16 or bases 16 in the vehicle 12. The base location sensors 78 may be communication with the vehicle computer 72. The base location sensors 78 may send a signal to the vehicle computer 72 to indicate the location of the base 16 along the tracks 34, 36, i.e., the vehicle-longitudinal axis L. The vehicle 12 may include any suitable number of base location sensors 78 to determine where long the tracks 34, 36, the bases 16 are located. In other words, the vehicle 12 may include a number of base location sensors 78 equal to the number of bases 16 in the vehicle 12. The bases 16 may move to a location corresponding to the location of the seats or wheelchairs 22 in the vehicle 12 and the base location sensors 78 identify whether the bases 16 are in the proper corresponding locations. The base location sensors 78 may be of any suitable type of sensor. For example, the base location sensors 78 may be cameras, weight sensors, touch sensors, etc.

The vehicle 12 may include at least one impact sensor 80 for sensing impact of the vehicle 12, and the vehicle computer 72 may be in communication with the impact sensors 80. The impact sensor 80 is configured to detect an impact to the vehicle 12. The impact sensor 80 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 80 may be located at numerous points in or on the vehicle 12.

The vehicle 12 may include at least one seating identifying sensor 82 to determine whether a wheelchair 22 or a seat is present in the vehicle 12. The seating identifying sensor 82 may be in communication with the vehicle computer 72. The seating identifying sensor 82 may send a signal to the vehicle computer 72 indicating the presence of a wheelchair 22 or the presence of a seat in the vehicle 12. The vehicle 12 may include any suitable number of seating identifying sensor 82 to determine the presence of any suitable number of wheelchairs 22 and/or seats in the vehicle 12. In other words, the vehicle 12 may include a number of seating identifying sensors 82 equal to the number of potential occupants which may be present in the vehicle 12. The seating identifying sensor 82 may be, for example, a camera in the passenger compartment 24 to identify the wheelchair 22 or the seat in the vehicle 12.

Figure 9:
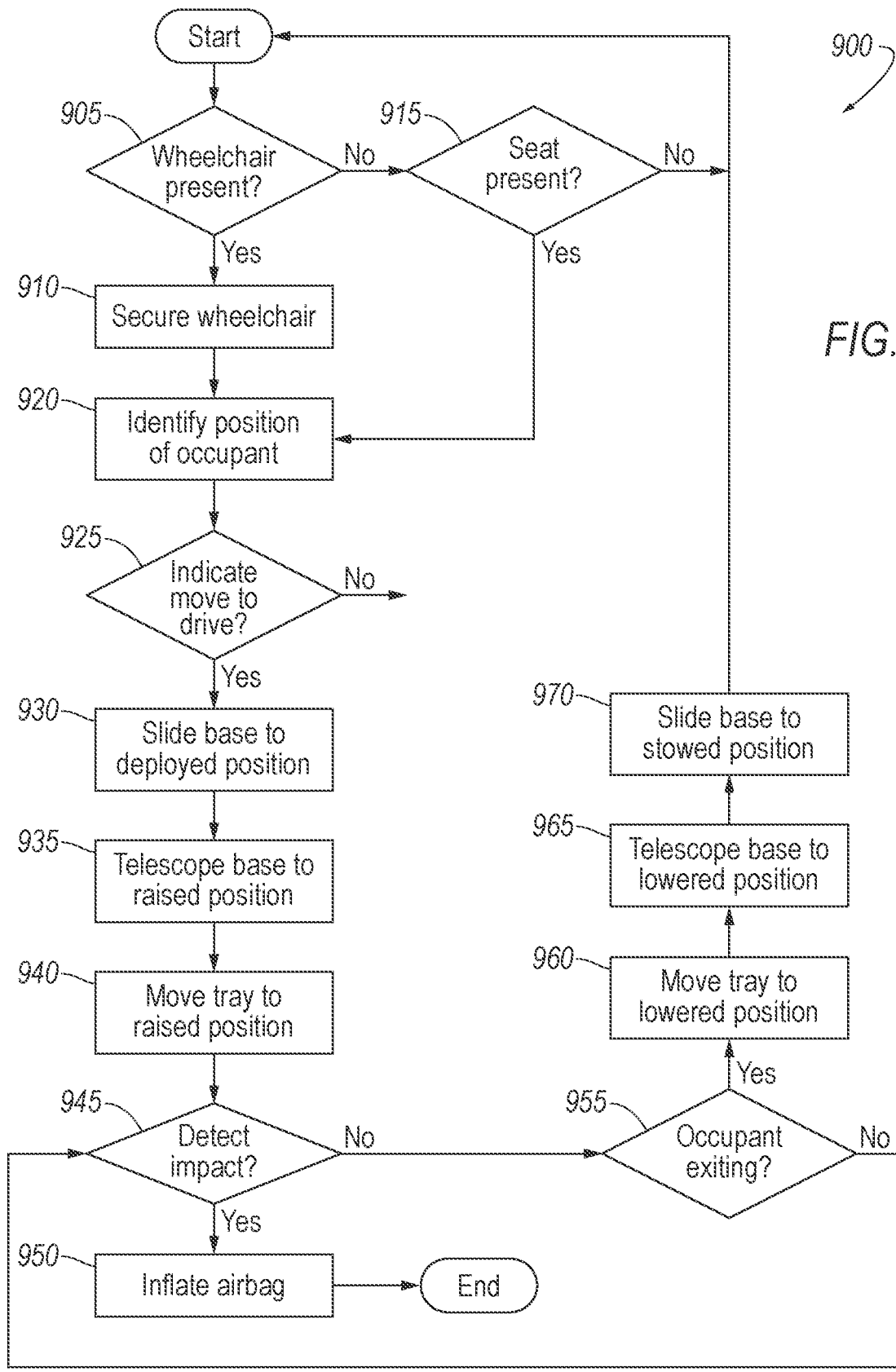
FIG. 9 is a flowchart of a method including instructions executable by a vehicle computer.

With reference to FIG. 9, the vehicle computer 72 stores instructions to control components of the vehicle according to the method 900. Specifically, the method 900 includes sliding the base 16 into a position corresponding to a position of an occupant in the vehicle 12. The vehicle computer 72 may perform the method 900 and/or may instruct other components to perform all or portions of the method 900. Use of "in response to," "based on," and "upon determining" herein indicates a causal relationship, not merely a temporal relationship.

With reference to decision block 905, the method 900 includes identifying whether a wheelchair 22 is present in the vehicle 12. Specifically, the method 900 includes seeking detection of the presence of a wheelchair 22 in the vehicle 12, i.e., detecting the presence and/or the lack of the presence of a wheelchair 22. Specifically, the method 900 includes seeking detection of the presence of a wheelchair 22 with the seating identifying sensor 82, e.g., the camera. In such an example, block 905 may include receiving data from the seating identifying sensor 82 indicating the presence of a wheelchair 22 and/or a lack of the presence of a wheelchair 22. If no wheelchair 22 is identified in block 905, the method 900 moves to decision block 915. If a wheelchair 22 is identified in block 905, the method 900 moves to block 910.

With reference to block 910, the method 900 includes securing the wheelchair 22 at the wheelchair 22. Specifically, method 900 includes limiting any movement of the wheelchair 22 during motion of the vehicle 12. For example, the latch 28 may be locked to limit the motion of the wheelchair 22 during operation of the vehicle 12. The latch 28 may be manually locked by an occupant of the vehicle 12 or may be automatically locked, for example, by the vehicle computer 72. When the latch 28 is locked, the method 900 moves to block 920.

With reference to decision block 915, the method 900 includes identifying whether a seat is present in the vehicle 12. Specifically, the method 900 includes seeking detection of the presence of a seat in the vehicle 12, i.e., detecting the presence or the lack of the presence of the seat. Specifically, the method 900 includes seeking detection of the seat with the seating identifying sensor 82, e.g., the camera. In such an example, block 915 may include receiving data from the seating identifying sensor 82 indicating the presence of a seat and/or a lack of the presence of a seat. If no seat is identified, the method moves to the start again. If a seat is identified, the method moves to block 920.

With reference to block 920, the method 900 includes identifying the position of an occupant in the vehicle 12. Specifically, the method 900 includes seeking a determination of a location along the vehicle-longitudinal axis L where the occupant is seated. In the example including a wheelchair 22, the position identified is the position of the wheelchair 22 along the vehicle-longitudinal axis L of the vehicle 12. In another example including a seat, the position identified is the position of the seat along the vehicle-longitudinal axis L of the vehicle 12. In both examples discussed above, block 920 may include receiving data from the occupant location sensor 76 indicating the position of the occupant in the wheelchair 22 or the seat along the vehicle-longitudinal axis L.

With reference to decision block 925, the method 900 includes determining whether the vehicle 12 will move into Drive to the vehicle computer 72. Specifically the method 900 includes identifying an indication that the vehicle 12 will move into Drive. The indication may be either an automated indication, e.g., the vehicle 12 identifies an occupant has entered the vehicle 12 and is seated through sensors, e.g., the camera in the passenger compartment 24, or by a manual indication, e.g., an occupant pressing a button indicating the occupant is ready to begin their trip in the vehicle 12. Decision block 925 includes receiving the indication from the vehicle computer 72 or the manual indication from the occupant. If the vehicle 12 is not determined to move into Drive, the method 900 returns to the start. If the vehicle 12 is determined to move into drive, the method 900 moves to block 930.

With reference to block 930, based on the indication that the vehicle 12 will move into Drive, the method 900 includes sliding the base 16 from the stowed position to the deployed position along the vehicle-longitudinal axis L. Specifically, the base 16 slides along the vehicle-longitudinal axis L to a position corresponding to the position of the occupant, i.e., the position of the wheelchair 22 or the seat. Specifically, the location identified by the occupant location sensor 76 includes a corresponding location for the base 16. The base location sensor 78 identifies the location of the base 16 corresponding to the location identified by the occupant location sensor 76 and slides the base 16 to the corresponding location, i.e., the deployed position. Block 930 includes locking the lock 50 of the tracks 34, 36 to secure the base 16 in the deployed position.

With reference to block 935, the method 900 includes telescoping the base 16 from the lowered position to the raised position adjacent the occupant, i.e., adjacent the wheelchair 22 or adjacent the seat, when the base 16 is in the position corresponding to the position of the wheelchair 22. Specifically, when the base 16 reaches the deployed position, block 935 includes telescoping the base 16 from the lowered position to the raised position.

With reference to block 940, the method 900 includes moving the tray 18 to the raised position. As described above, the tray 18 may be moved from the lowered position to the raised position automatically, e.g., by the push of a button, or may be moved manually, e.g., by the occupant seated in the wheelchair 22 or seat. In an example where the tray 18 moves automatically, a motor (not shown) may move the tray 18 to the raised position. In examples where the tray 18 is moved manually, the occupant may move the tray 18 to the raised position.

With reference to decision block 945, the method 900 includes detecting an impact to the vehicle 12. The impact sensors 80 may identify the impact to the vehicle 12 to the vehicle computer 72. If an impact is detected, the method 900 moves to block 950. If no impact is detected, the method moves to block 955.

With reference to block 950, based on detection of an impact to the vehicle 12, the method 900 includes inflating the airbag 20. Specifically, the airbag 20 inflates from the uninflated position to the inflated position based on the detection of the impact to the vehicle 12. The vehicle computer 72 may communicate with the inflator 70 to inflate the airbag 20 to the inflated position in the event of the impact to the vehicle 12.

With reference to decision block 955, the method 900 includes determining whether an occupant is preparing to exit the vehicle 12. The determination of whether an occupant is preparing to exit the vehicle 12 may be based on the occupant indicating to the vehicle computer 72, e.g., by pressing a button in the vehicle 12, that the occupant will be exiting the vehicle 12. If the vehicle 12 is determined to be in continued use, e.g., in Drive, the method 900 returns to decision block 945 to detect an impact to the vehicle 12. Decision block 955 may include identifying whether the vehicle 12 has been moved to Park and the occupant will be exiting the vehicle 12. If there is no determination that an occupant will be leaving the vehicle 12, the method 900 moves back to decision block 945. If an occupant is determined to be leaving the vehicle 12, the method 900 moves to block 960.

With reference to block 960, based on determining an occupant is preparing to exit the vehicle 12, the method 900 includes moving the tray 18 to the lowered position. As described above, the tray 18 may be moved from the raised position to the lowered position automatically, e.g., by the push of a button, or may be moved manually, e.g., by the occupant seated in the wheelchair 22 or seat. In an example where the tray 18 moves automatically, a motor (not shown) may move the tray 18 to the lowered position. In examples where the tray 18 is moved manually, the occupant may move the tray 18 to the lowered position.

With reference to block 965, the method 900 includes telescoping the base 16 from the raised position to the lowered position adjacent the occupant, i.e., adjacent the wheelchair 22 or adjacent the seat, when the base 16 is in the position corresponding to the position of the wheelchair 22. Specifically, when the base 16 is still in the deployed position, block 965 includes telescoping the base 16 from the raised position to the lowered position.

With reference to block 970, the method 900 includes sliding the base 16 from the deployed position to the stowed position along the vehicle-longitudinal axis L. Specifically, the base 16 moves from the deployed position to the stowed position to allow for the occupant to exit the vehicle 12. The method 900 moves to the start again once the base 16 is in the stowed position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
   a vehicle floor;
   a base slidably supported by the vehicle floor, the base being slidable relative to the vehicle floor from a stowed position to a deployed position;
   a tray supported by the base; and
   an airbag supported by the base adjacent the tray.

2. The assembly of claim 1, further comprising a track supported by the vehicle floor, the base being slidably engaged with the track.

3. The assembly of claim 2, further comprising a second track supported by the vehicle floor and spaced from the track, the base being slidably engaged with the second track.

4. The assembly of claim 3, wherein the base includes a pair of legs spaced from each other and a top portion extending from one leg to the other leg, the legs being slidably engaged with the track and the second track.

5. The assembly of claim 2, wherein the track is elongated along a vehicle-longitudinal axis.

6. The assembly of claim 1, wherein the base is slidable along a vehicle-longitudinal axis from the stowed position to the deployed position.

7. The assembly of claim 1, wherein the base includes a pair of legs spaced from each other and a top portion extending from one leg to the other leg, the legs being slidably supported by the vehicle floor.

8. The assembly of claim 7, wherein the legs are telescopic from a lowered position to a raised position.

9. The assembly of claim 7, wherein the airbag is supported by the top portion.

10. The assembly of claim 1, wherein the base is telescopic from a lowered position to a raised position.

11. The assembly of claim 1, further comprising a dash, the base being adjacent the dash in the stowed position and spaced from the dash in the deployed position.

12. The assembly of claim 11, wherein the airbag is inflatable away from the dash.

13. The assembly of claim 11, wherein the dash defines a recess, the recess receiving the base in the stowed position.

14. The assembly of claim 1, wherein the tray is rotatable from a lowered position to a raised position and the airbag is inflatable from an uninflated position to an inflated position, the airbag abutting the tray when the tray is in the raised position and the airbag is in the inflated position.

15. The assembly of claim 1, wherein the base slides vehicle-rearward from the stowed position to the deployed position.

16. The assembly of claim 1, wherein the airbag inflates vehicle-rearward from the base.

17. The assembly of claim 1, further comprising a computer including a processor and a memory storing instructions executable by the processor to:
   identify a position of a wheelchair along a vehicle-longitudinal axis of a vehicle; and
   slide the base along the vehicle-longitudinal axis to a position corresponding to the position of the wheelchair.

18. The assembly of claim 17, wherein the memory stores instructions executable by the processor to inflate the airbag in response to detection of a vehicle impact.

19. The assembly of claim 17, wherein the memory stores instructions executable by the processor to telescope the base from a lowered position to a raised position adjacent the wheelchair when the base is in the position corresponding to the position of the wheelchair.

20. The assembly of claim 17, wherein the memory stores instructions executable by the processor to indicate the vehicle will move into Drive and slide the base from the stowed position to the deployed position based on the indication that the vehicle will move into Drive.

* * * * *